(12) United States Patent
Toillon et al.

(10) Patent No.: US 9,684,792 B2
(45) Date of Patent: Jun. 20, 2017

(54) CRITICAL DATA TRANSMISSION ARCHITECTURE IN AVIONICS SYSTEMS

(71) Applicant: THALES, Neuilly sur Seine (FR)

(72) Inventors: Patrice Georges Paul Toillon, Meudon la Foret (FR); David José Faura, Meudon la Foret (FR); Vincent Christophe Cédric Sollier, Meudon la Foret (FR); Paul Marie Boivin-Champeaux, Meudon la Foret (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/566,456

(22) Filed: Dec. 10, 2014

(65) Prior Publication Data

US 2015/0161403 A1 Jun. 11, 2015

(30) Foreign Application Priority Data

Dec. 10, 2013 (FR) ...................................... 13 02884

(51) Int. Cl.
*G06F 21/60* (2013.01)
*H04L 9/32* (2006.01)
(Continued)

(52) U.S. Cl.
CPC ............. *G06F 21/606* (2013.01); *G09C 1/00* (2013.01); *H04L 9/3236* (2013.01); *H04L 9/3242* (2013.01); *H04L 63/123* (2013.01)

(58) Field of Classification Search
CPC ....... G06F 21/606; G09C 1/00; H04L 9/3236; H04L 9/3242; H04L 63/123
See application file for complete search history.

(56) References Cited

U.S. PATENT DOCUMENTS

| 4,771,458 A | * | 9/1988 | Citta | ..................... | H04H 60/23 |
|  |  |  |  |  | 348/E7.056 |
| 5,642,471 A | * | 6/1997 | Paillet | .................... | G06N 5/047 |
|  |  |  |  |  | 706/47 |

(Continued)

FOREIGN PATENT DOCUMENTS

| CN | 102143185 A | 8/2011 |
| GB | 2013/052754 | * 10/2012 |
| WO | WO 2010/000965 A2 | 1/2010 |

OTHER PUBLICATIONS

Search Report dated Aug. 6, 2014 for French Patent Application No. 1302884, filed Dec. 10, 2013.

(Continued)

*Primary Examiner* — Carl Colin
*Assistant Examiner* — Vance Little
(74) *Attorney, Agent, or Firm* — Knobbe, Martens, Olson & Bear, LLP

(57) ABSTRACT

A critical data transmission architecture in avionics systems is disclosed. The system includes a module of production, a module of consumption, and at least one physical pathway linking the module of production to the module of consumption. The module of production is configured to transmit each critical datum by at least two data, one of a first independent type and one of a second independent type that cannot interfere with one another. Each datum of the first type or the second type is transmitted in the form of a data transmission unit including a portion of an application message and a message. The additional message of each transmission unit includes a verification sequence and each datum of the first type and the second type is transmitted by the same physical pathway and is generated by different module of generation.

15 Claims, 4 Drawing Sheets

(51) Int. Cl.
*G09C 1/00* (2006.01)
*H04L 29/06* (2006.01)

(56) References Cited

U.S. PATENT DOCUMENTS

| | | | |
|---|---|---|---|
| 7,536,631 B1 * | 5/2009 | Yang | H03M 13/13 |
| | | | 714/747 |
| 8,375,217 B2 * | 2/2013 | Schmidt | H04L 1/0057 |
| | | | 700/78 |
| 2013/0031595 A1 * | 1/2013 | Nevstruev | G06F 21/6245 |
| | | | 726/1 |

OTHER PUBLICATIONS

Henk Van Tilborg, Encyclopedia of Cryptography and Security: MAC Algorithms, dated Jan. 1, 2005, pp. 361-368, XP055131960.
Land et al, Architecting ARINC 664, Part 7 (AFDX) Solutions, dated May 22, 2009, pp. 1-25, XP007918728.

* cited by examiner

CRITICAL DATA TRANSMISSION ARCHITECTURE IN AVIONICS SYSTEMS

BACKGROUND

Field

The described technology generally relates to a critical data transmission architecture in avionics systems.

Description of the Related Art

More specifically, the described technology generally relates to such a critical data transmission architecture in avionics systems. Various critical data transmission architectures for avionics systems exist in the prior art.

Generally, these transmission architectures are based on aeronautics standard ARINC 664.

These architectures, as well as the corresponding transmission systems, are based on switch-type intermediate communication systems (IS) and end system (ES) interfaces located in each piece of participating equipment.

Together, these IS form a physical critical data transmission pathway for avionics systems.

There are also critical avionics data that must maintain absolute integrity between and relative to one another. The transmission of such critical data cannot be carried out by the same physical pathways.

Thus, for example, critical avionics data related to 'catastrophic' or 'hazardous' systems are generally transmitted in the form of verification data and one or more monitoring data.

Upon the receipt of such data, the integrity of the initial critical data may be verified by comparing the/each monitoring datum with the verification datum.

The verification data and the/each monitoring datum must thus be independent of one another in order to minimize the risk of similar malfunctions.

In particular, similar malfunctions may cause the same types of errors in all monitoring and verification data, which would make it impossible to detect transmission errors.

To date, the response to this issue is to use separate physical transmission pathways and separate transmission resources.

This module, for example, that data of different types (verification, monitoring) cannot pass through the same switches or cables or physical ports that connect various nodes, for example, of a avionics computer communications network.

However, this complexity is not compatible, in particular, with the objectives of reducing weight, overall reduction of costs of modern avionics systems, etc.

Furthermore, this complexity creates difficulties for the analysis of such systems to the extent that each use of a physical pathway by a critical datum must be associated with the analysis of its exclusion with regard to other critical data.

SUMMARY OF CERTAIN INVENTIVE ASPECTS

One inventive aspect is a system for transmitting avionics application data structures that allows for the detection of faults in the integrity of an application message at a level compatible with the requirements of aeronautics and circumvents the type of module of transmission of an avionics computer network.

To this end, another aspect is a critical data transmission architecture for avionics systems of the aforementioned type, in which:

the additional message of each transmission unit includes a control sequence intended to verify the integrity of the application message; and each datum of the first type and the second type corresponding to this critical datum is transmitted by the same physical pathway implemented by the same intermediate communication equipments, and is generated by different and distinct modules of generation.

According to certain embodiments, the critical data transmission architecture includes one or more of the following characteristics:

the difference between the generation modules lies in the different physical locations, and/or the source partition identifications, and/or the message identifications, and/or the logical communication channel identifications, and/or the production module identifications, and/or recipient or recipient group identifications, and/or network or protocol types, and/or physical device type of these generation modules;

the difference between the generation modules further lies in different and/or complementary, predetermined production rules of at least one part of the corresponding data;

the selection rule of the production rule depends on the sources and/or criteria of the differences and the parameterization criteria of this selection rule, whereby the parameterization criteria of the selection rule include:

a level of criticality of the emitting equipment and/or the source partition, a level of security of the emitting equipment and/or the source partition, and quality criteria related to one message relative to another;

each transmission unit further includes an identification sequence including a static part identifying the application message corresponding to this transmission unit and a variable part distinguishing the message in a unique and certain fashion;

the verification sequence corresponding to the transmission unit is based on a main sequence representing a cyclical redundancy control code of the concatenation of at least one portion of the application message corresponding to the transmission unit with the identification sequence;

the verification sequence and the identification sequence corresponding to a single transmission unit are distinct;

the verification sequence is the result of the application of the operator XOR between:

a sequence resulting from the encoding of at least one part of the identification sequence with a key represented by a field of the variable part of the identification sequence; and the main sequence;

the verification sequence is the result of the application of the operator XOR between:

a sequence resulting from the encoding of at least one part of the identification sequence with a key represented by a sequence that is variable over time and known to the production and consumption module at all times; and the main sequence;

the verification sequence is the result of the application of the operator XOR between:

a sequence resulting from the encoding of at least one part of the identification sequence with a first key represented by the encoding of a field of the variable part of the identification sequence with a second key represented by a sequence known to the modules of production and consumption; and the main sequence;

the verification sequence is the result of the application of the operator XOR between:

a sequence resulting from the encoding of at least one part of the identification sequence with a first key represented by the result of the application of the operator XOR between:
  a field of the variable part of the identification sequence; and
  a sequence known to the modules of production and consumption; and
the main sequence;
the verification sequence is the result of the application of the operator XOR between:
a sequence resulting from the encoding of at least one part of the identification sequence and at least one part of the application message with a key represented by a field of the variable part of the identification sequence; and
the main sequence;
the verification sequence is the result of the application of the operator XOR between:
a sequence resulting from the encoding of at least one part of the identification sequence and at least one portion of the application message with a key represented by a sequence that is variable over time and known to the production and consumption modules at all times; and
the main sequence;
the verification sequence is the result of the application of the operator XOR between:
a sequence resulting from the encoding of at least one part of the identification sequence and at least one portion of the application message with a first key represented by the encoding of a field of the variable part of the identification sequence with a second key represented by a sequence known to the modules of production and consumption; and
the main sequence;
the verification sequence is the result of the application of the operator XOR between:
a sequence resulting from the encoding of at least one part of the identification sequence and at least one portion of the application message with a first key represented by the result of the application of the operator XOR between:
  a field of the variable part of the identification sequence; and
  a sequence known to the modules of production and consumption; and
the main sequence;
the/each key is only known to the modules of production and consumption also in order to ensure the confidentiality of the messages;
for an application message including a plurality of sequenced portions, the verification sequence of the transmission unit associated with the first portion is the result of the application of the operator XOR between:
a sequence resulting from the encoding of a sequence represented by the result of the application of the operator XOR between:
  at least one part of the identification sequence corresponding to this portion; and
  a predetermined initial value; and
the main sequence corresponding to this portion; and the verification sequence of the transmission unit associated with the each following portion is the result of the application of the operator XOR between:
an auxiliary sequence resulting from the encoding of a sequence represented by the result of the application of the operator XOR between:
  at least one part of the identification sequence corresponding to this portion; and
  an auxiliary sequence corresponding to the preceding portion; and
the main sequence corresponding to this portion;
for an application message including a plurality of sequenced portions, the verification sequence of the transmission unit associated with the first portion is the result of the application of the operator XOR between:
a sequence resulting from the encoding of a sequence represented by the result of the application of the operator XOR between:
  at least one part of the identification sequence and at least one portion of the application message; and
  a predetermined initial value; and
the main sequence corresponding to this portion;
and the verification sequence of the transmission unit associated with the each following portion is the result of the application of the operator XOR between:
an auxiliary sequence resulting from the encoding of a sequence represented by the result of the application of the operator XOR between:
  at least one part of the identification sequence and at least one portion of the application message; and
  an auxiliary sequence corresponding to the preceding portion; and
the main sequence corresponding to this portion;
the verification sequence is distributed in the identification sequence based on a distribution rule known to the production and consumption modules;
the distribution rule is constant over time;
the distribution rule is variable over time;
the rule is only known to the modules of production and consumption also in order to ensure the confidentiality of the messages;
the identification sequence includes information selected from the group further comprising:
identifying information of the module of production of the corresponding application message,
identifying information of the corresponding application message,
information on the logical order of the corresponding application message,
information on the logical sequence number of the corresponding application message,
information on the date of generation of the corresponding application message,
the additional message is associated with the application message in whole or in part by portion.

BRIEF DESCRIPTION OF THE DRAWINGS

The described technology will be better understood based on the following description, provided by way of example only, referring to the attached drawings, in which.

DETAILED DESCRIPTION OF CERTAIN INVENTIVE ASPECTS

Figure 1:
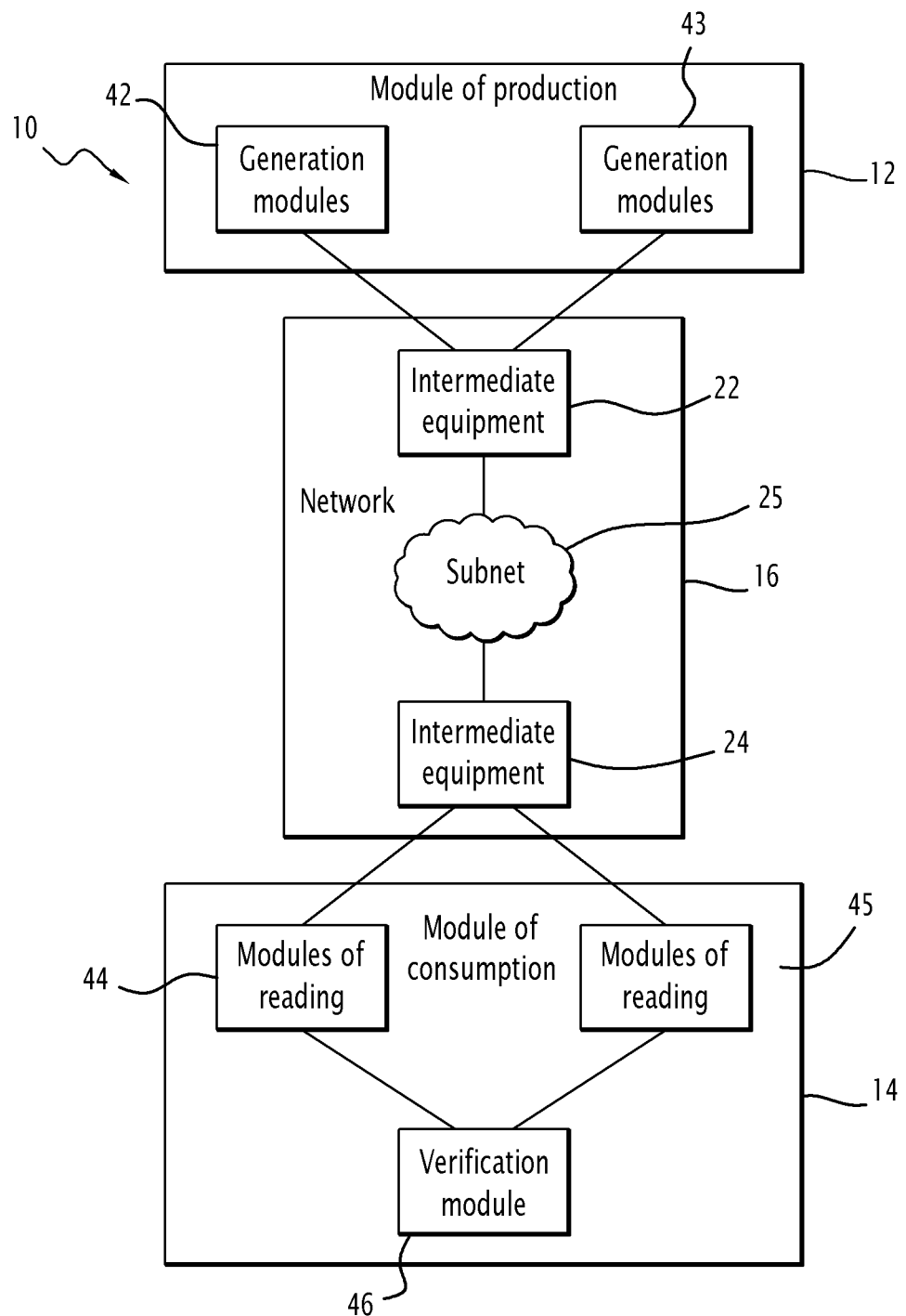
FIG. 1 is a schematic view of a critical avionics data transmission architecture according to an embodiment.

FIG. 1 shows an example of a critical data transmission architecture indicated by the general reference numeral 10 in FIG. 1.

This data transmission architecture 10 can be used in avionics systems.

Such a transmission architecture 10 includes, e.g., module of production of critical avionics data and module of consumption of these critical avionics data, indicated respectively by general reference numerals 12 and 14 in FIG. 1.

The module of production 12 is represented by any module suitable to produce critical avionics data intended for the module of consumption 14. Such module comprises, e.g., equipment, a component, a sensor, a partition, an application, software, and/or material.

Analogously, the module of consumption 14 is represented by any module suitable to consume critical avionics data transmitted by the module of production. Such module comprises, e.g., equipment, a component, an actuator, a partition, an application, software, and/or material.

The modules of production 12 and consumption 14 are, e.g., on board an aircraft.

The modules of production and consumption are connected by an avionics computer communications network indicated by general reference numeral 16 in FIG. 1.

This network 16 includes a plurality of tangible resources, e.g., cables physically connecting the modules of production and consumption and, e.g., switches ensuring the transfer of digital data between these modules.

This network 16 also includes a plurality of intangible resources that ensure such transfer at the software level.

These resources include, e.g., processing resources, storage resources, or communications resources.

The network 16 further includes, e.g., intermediate equipment indicated by general reference numerals 22 and 24 in FIG. 1 that can be connected by an assembly of devices forming a subnet indicated by reference numeral 25 in FIG. 1 and, in that case, forming a physical transmission pathway between the data production 12 and consumption modules 14.

The computer network 16 complies with, e.g., communications standard ARINC 664.

The architecture of the network 16 is suited to support, e.g., the IMA (Integrated Modular Avionics) concept.

The module of production 12 is suited to transmit critical data to the module of consumption 14 using the same physical pathway or network 16.

The critical avionic data include, e.g., control instructions for the aircraft.

Based on their precise functions, these instructions may be redundant and/or meet a certain level of reliability.

In one variant, the critical avionics data are data associated with 'catastrophic' or 'hazardous' modules of production and/or consumption.

Each critical datum is transmitted by at least two independent data, one of a first type and one of a second type.

Thus, for example, a datum of the first type is a verification datum DC, and a datum of the second type is a monitoring datum DS that allow for the verification of the integrity of the verification datum DC.

In one variant, each critical avionics datum is transmitted by a verification datum DC and several monitoring data DS.

More broadly, certain embodiments may apply to all types of data streams that cannot interfere with one another.

For its part, each verification datum DC or monitoring datum DS, or, more broadly, each type of data stream, is transmitted in the form of a data transmission unit via the computer network 16.

Figure 2:
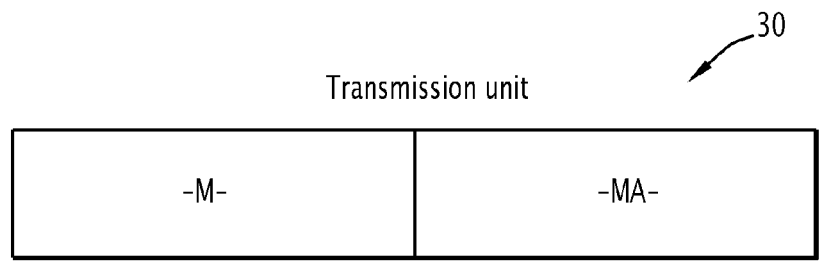
FIG. 2 is a schematic view of a transmission unit to be transmitted by the architecture of FIG. 1.

An example of such a transmission unit is shown schematically in FIG. 2, where this transmission unit is designated by general reference 30.

The transmission unit 30 includes an application message M representing a verification datum DC or a monitoring datum DS.

Furthermore, the transmission unit 30 includes an additional message MA including, e.g., identifying and verification information associated with the application message M.

In one variant, the transmission unit includes a portion P of the application message M and an additional message MA associated with this portion.

Thus, the message M is divided into a plurality of portions P, and each portion P is transmitted via the network 16 by a transmission unit.

Each portion P thus represents a portion of a verification datum DC or a monitoring datum DS.

Thus, 'data transmission unit', within the meaning of this specification, generally refers to the association of an application message M or a portion P of this application message M with an additional message MA as defined above.

Figure 3:
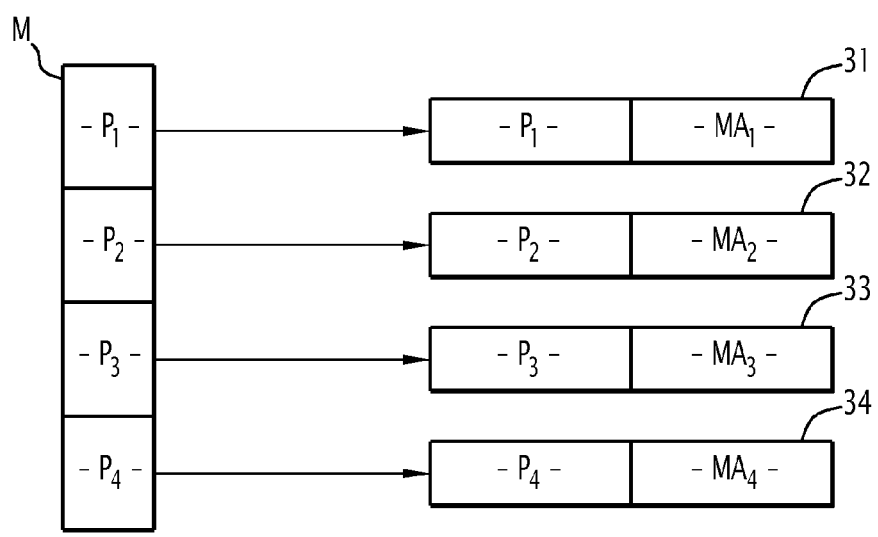
FIG. 3 is a schematic of a division of an application message to be transmitted by the architecture of FIG. 1 in a plurality of portions.

FIG. 3 shows a message M divided into four portions $P_1$, $P_2$, $P_3$, and $P_4$. These portions are transmitted via the network 16 by independent transmission units designated respectively by the reference numerals 31, 32, 33, and 34 in FIG. 3.

Each transmission unit 31, 32, 33, and 34 includes a corresponding portion $P_1$, $P_2$, $P_3$, and $P_4$ and an additional message $MA_1$, $MA_2$, $MA_3$, and $MA_4$ including, e.g., identifying and verification information associated with the respective portion.

Such a division allows for the optimization of the coverage of the integrity mechanism by adapting the length of the portion to the inherent performance of the control used by the network 16.

This division further allows for the optimization of the operation of the network 16 by adapting the length of the portion to the processing speed of the portion by the production 12 and consumption modules 14.

The production module 12 includes a module of generating transmission units corresponding to verification data DC and a module of generating transmission units corresponding to monitoring data DS. These modules are designated respectively by general reference numerals 42 and 43 in FIG. 1.

Thus, the generation modules 42 or 43 are suited to receive a critical avionics datum originating from the module of production 12.

For each critical avionics datum, the module 42 is suited to generate a verification datum DC corresponding to this critical avionics datum, and the module 43 is suited to generate a monitoring datum DS corresponding to this critical avionics datum or this verification datum DC, and, more broadly, to all types of data streams that cannot interfere with one another.

The modules 42 and 43 are also suited to form a transmission unit 30 for each application message M representing a verification datum DC or a monitoring datum DS by adding an additional message MA associated with the application message M.

The modules 42 and 43 are also suited to generate a transmission unit 30 for each portion P associated with an application message M.

Lastly, the modules 42 and 43 are suited to transmit the transmission units 30 generated on the network 16.

The generation module 42 and the generation modules 43 are distinct.

In particular, these generation modules 42 and 43 have, e.g., different physical locations.

Additionally or alternatively, the generation modules 42 and 43 use different and/or complementary, predetermined production rules of at least one part of the corresponding data. These different and/or complementary, predetermined production rules are described in greater detail below.

Additionally or alternatively, the generation modules 42 and 43 differ with regard to other sources and/or criteria:

These include, for example:
the identification of the source partition or application;
the identification of the message;
the identification of the logical communications channel;
the identification of the production module (host processor, element processor);
the identification of the recipient or group of recipients;
the type of network or protocol;
the type of physical device.

These sources and/or criteria distinguishing the modules of generation 42 and 43 imply that these modules are different.

Furthermore, the selection rule of the production rule (amongst the predetermined encoding rules of the transmission unit) within the generation modules 42 and 43 depends on the sources and/or criteria of difference as well as the parameterization criteria of this selection rule. The parameterization criteria of the selection rule include, e.g.:
the level of criticality of the emitting equipment and/or the source partition;
the level of security of the emitting equipment and/or the source partition;
and, more broadly, quality criteria related to one message relative to another;

Likewise, the consumption module includes a module of reading transmission units corresponding to verification data DC and a module of reading transmission units corresponding to monitoring data DS. These modules are designated respectively by general reference numerals 44 and 45 in FIG. 1.

The reading modules 44 and 45 are distinct and different as defined above.

Thus, the reading module 44 is suited to receive transmission units 30 corresponding to verification data DC, and the reading module 45 is suited to receive transmission units 30 corresponding to monitoring data DS.

The modules 44 and 45 are further suited to extract from each transmission unit received the application message M or the portion P of the application message M corresponding to this transmission unit.

Such a message M thus represents a verification datum DC or a monitoring datum DS.

Likewise, such a portion P thus represents a portion of a verification datum DC or a monitoring datum DS.

The modules 44 and 45 are also suited to read the additional message MA corresponding to each portion P or each message M received.

This additional message MA, in particular, allows the reading modules 44 and 45 to verify the integrity of the message M received or the portion P received.

The reading modules 44 and 45 are also suited to reconstitute an application message M from the portions P received of the message.

Accordingly, these modules are suited to reconstruct any verification DC or monitoring data DS based on the portions received of these data.

Lastly, the reading modules 44 and 45 are suited to transmit each verification datum DC and the monitoring datum DS corresponding to this verification datum DC to the verification module designated by general reference numeral 46 in FIG. 1.

These verification modules 46 are suited to analyze the verification datum DC and the monitoring datum DS corresponding to each verification datum DC to form the corresponding critical avionics datum.

In the following, no distinction will be made between an application message M and a portion P of an application message M. The term 'application message M' will refer to an application message M or a portion P of an application M as defined above.

Figure 4:
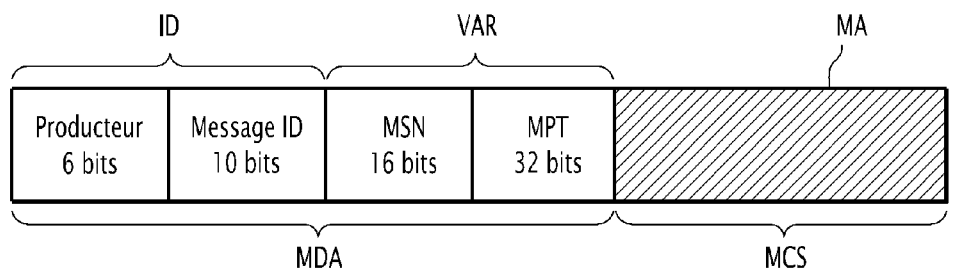
FIG. 4 is a schematic view of an additional message without distribution that is part of the transmission unit of FIG. 2.

FIG. 4 is a schematic representation of an example of a structure of an additional message MA without distribution associated with an application message M. Such a message M represents a verification datum DC or a monitoring datum DS.

The additional message MA is suited to be formed by the generation modules 42 or 43 and to be read by the reading modules 44 or 45 of FIG. 1.

Thus, according to FIG. 4, the additional message MA includes an identification sequence MDA.

This identification sequence MDA includes a static part ID that identifies the application message M and its source on the network, and a variable part VAR distinguishing the application message M in a unique and certain fashion and, in particular, distinguishing two instances of the same message.

Thus, for example, the static part ID includes a first field and a second field.

The first field is, e.g., 6 bits in size and includes, e.g., an identifier of the producer of the application message M.

This identifier uniquely identifies the production module 12 that transmitted this message M on the network 16. It corresponds, e.g., to a partition ID source in the case of IMA architecture of the ARINC 653 type.

In one variant, this identifier corresponds to the sensor number associated with the production module 12.

In another variant, this identifier corresponds to the position of the production module 12.

The second field is, e.g., 10 bits in size and includes, e.g., an identifier of the application message M on the network 16.

The variable part VAR of the sequence MDA includes, e.g., a field MSN and a field MPT.

The field MSN is, e.g., 16 bits in size and includes a number corresponding to the logical order of the application message M.

In one variant, the field MSN may also associate the logical order of the portion P for the same message order with the logical order of the application message M.

The field MPT is, e.g., 32 bits in size and comprises, e.g., the date (time) of the generation of the application message M.

The additional message MA further includes a verification sequence MCS intended to verify the integrity of the application message M, and is based on a main sequence SP.

The main sequence SP is represented, e.g., by a cyclic redundancy check CRC of the concatenation of the application message M with the identification sequence MDA, i.e.:

$$SP = CRC(M \circ MDA)$$

where ○ refers to the concatenation operator.

The cyclic redundancy check code CRC is obtained, e.g., using one or more generator polynomials.

These generator polynomials are, e.g., complementary for a message M representing a verification datum DC and for a message M representing a monitoring datum DS corresponding to this verification datum DC.

According to a first embodiment, the verification sequence is the result of the application of the operator XOR between an auxiliary sequence and the main sequence SP.

In this embodiment, the auxiliary sequence is a sequence resulting from the encoding of at least one part of the identification sequence MDA with a key represented by the field MPT of the identification sequence MDA.

This part of the identification sequence MDA is represented, e.g., by all or part of the static part ID and all or part of the field MSN.

Such encoding is carried out, e.g., with a Hash rule (or other cryptographic primitives) with a key represented by the field MPT. Thus, the key is different from one application message M to another and is variable over time for the same producer.

For a message M representing a verification datum DC and a message M representing a monitoring datum DS corresponding to this verification datum DC, the Hash rules used are different or complementary.

Thus, the verification sequence MCS may be determined using the following relation:

$$MCS = XOR[E_{KeyA}(ID \circ MSN); SP]$$

where $E_{KeyA}$ refers to the cryptographic primitive used (e.g., the Hash rule) and KeyA refers to the key represented by the field MPT.

In one variant, the encoding is applied to the static part ID, the field MSN, and the application message M: This gives the following relation:

$$MCS = XOR[E_{KeyA}(ID \circ MSN \circ M); SP].$$

According to a second embodiment, the verification sequence is the result of the application of the operator XOR between an auxiliary sequence and the main sequence SP.

In this embodiment, the auxiliary sequence is a sequence resulting from the encoding of at least one part of the identification sequence MDA with a key represented by a sequence that is variable over time.

This sequence is known to the modules of production and consumption at all times.

This part of the identification sequence MDA is represented, e.g., by all or part of the static part ID and all or part of the field MSN.

Such encoding is carried out, e.g., with a Hash rule with a key that changes cyclically.

For a message M representing a verification datum DC and a message M representing a monitoring datum DS corresponding to this verification datum DC, the Hash rules used are different or complementary.

The cyclic change, in particular, allows the production and consumption modules to know the key without having explicitly communicated it via the network 16.

Thus, the verification sequence MCS may be determined using the following relation:

$$MCS = XOR[E_{KeyA(t)}(ID \circ MSN); SP]$$

where KeyA(t) refers to the cyclic key that is variable over time.

In one variant, the encoding is applied to the static part ID, the field MSN, and the application message M. This gives the following relation:

$$MCS = XOR[E_{KeyA(t)}(ID \circ MSN \circ M); SP].$$

According to a third embodiment, the verification sequence is the result of the application of the operator XOR between an auxiliary sequence and the main sequence SP.

In this embodiment, the auxiliary sequence is a sequence resulting from the encoding of at least one part of the identification sequence MDA with a first key.

Such encoding is carried out with a Hash rule.

For a message M representing a verification datum DC and a message M representing a monitoring datum DS corresponding to this verification datum DC, the Hash rules used are different or complementary.

This part of the identification sequence MDA is represented, e.g., by all or part of the static part ID and all or part of the field MSN.

The first key is represented by encoding the field MPT of the identification sequence MDA with a second key.

Such encoding is carried out, e.g., with an encoding function with a key that is different from one message to another and varies over time.

The second key is represented by a sequence known to the modules of production and consumption.

This second key is only known to the modules of consumption and production in question, and is stored in their respective configuration table.

These modules, in particular, that the key is not suited to be known externally, allow the data transmitted to be authenticated.

Thus, the verification sequence MCS may be determined using the following relation:

$$MCS = XOR[E_{KeyA}(ID \circ MSN); SP]$$

where KeyA refers to the first key defined by the relation:

$$KeyA = F_{KeyB}(MPT)$$

where F refers to the encoding function, and KeyB to the second key.

In one variant, the first encoding is applied to the static part ID, the field MSN, and the application message M. This gives the following relation:

$$MCS = XOR[E_{KeyA}(ID \circ MSN \circ M); SP].$$

According to a fourth embodiment, the verification sequence is the result of the application of the operator XOR between an auxiliary sequence and the main sequence SP.

In this embodiment, the auxiliary sequence is a sequence resulting from the encoding of at least one part of the identification sequence MDA with a first key.

Such encoding is carried out with a Hash rule.

For a message M representing a verification datum DC and a message M representing a monitoring datum DS corresponding to this verification datum DC, the Hash rules used are different or complementary.

This part of the identification sequence MDA is represented, e.g., by the static part ID and the field MSN.

The first key is represented by the result of the application of the operator XOR between the field MPT of the identification sequence MDA and a sequence known to the modules of production and consumption.

This sequence is only known to the modules of consumption and production in question, and is stored in their respective configuration table.

This module, in particular, that the key is not suited to be known externally, allows the data transmitted to be authenticated.

The key is different from one application message M to another and is variable over time.

Thus, the verification sequence MCS may be determined using the following relation:

$$MCS = XOR[E_{KeyA}(ID \circ MSN); SP]$$

where KeyA refers to the first key defined by the relation:

$$KeyA = XOR[KeyB; MPT]$$

where KeyB refers to the sequence known to the modules of production and consumption.

In one variant, the first encoding is applied to the static part ID, the field MSN, and the application message M. This gives the following relation:

$$MCS = XOR[E_{KeyA}(ID \circ MSN \circ M); SP].$$

In all four embodiments described above, when an application message M refers to a portion P of an application message M, i.e., when the application message M is divided into a plurality of portions P, the creation of the part MCS of the additional message MA associated with a portion P is independent of the other portions P of the same application message. Thus, in all four embodiments described above, the method for verifying the integrity of an application message M is referred to as 'without chaining'.

Below, Seq refers to the input sequence of the cryptographic primitive $E_{KeyA}$, represented, e.g., by the Hash rule according to one of the aforementioned four embodiments.

According to a fifth embodiment, the input sequence of the cryptographic primitive $E_{KeyA}$ of the first portion P of an application message M is the result of the application of the operator XOR between the sequence $Seq_1$ corresponding to the first portion P and a predetermined initial value IV, i.e.:

$$MCS_1 = XOR[E_{KeyA}(XOR[Seq_1; IV]); SP].$$

The input sequence of the encoding of the following portions P of the same application message M is the result of the application of the operator XOR between the sequence $Seq_i$ and an auxiliary sequence calculated by the preceding portion:

$$MCS_i = XOR[E_{KeyA}(XOR[Seq_i; SA_{i-1}]); SP],$$

where i refers to the number of the portion P in the application message M, $SA_{i-1}$ refers to the auxiliary sequence calculated for the portion P having the number i−1, i.e.:

$$SA_i = E_{KeyA}(XOR[Seq_i; SA_{i-1}]) \text{ and}$$

$$SA_1 = E_{KeyA}(XOR[Seq_1; IV])$$

Thus, this embodiment is recursive and known as 'with chaining'.

Figure 5:
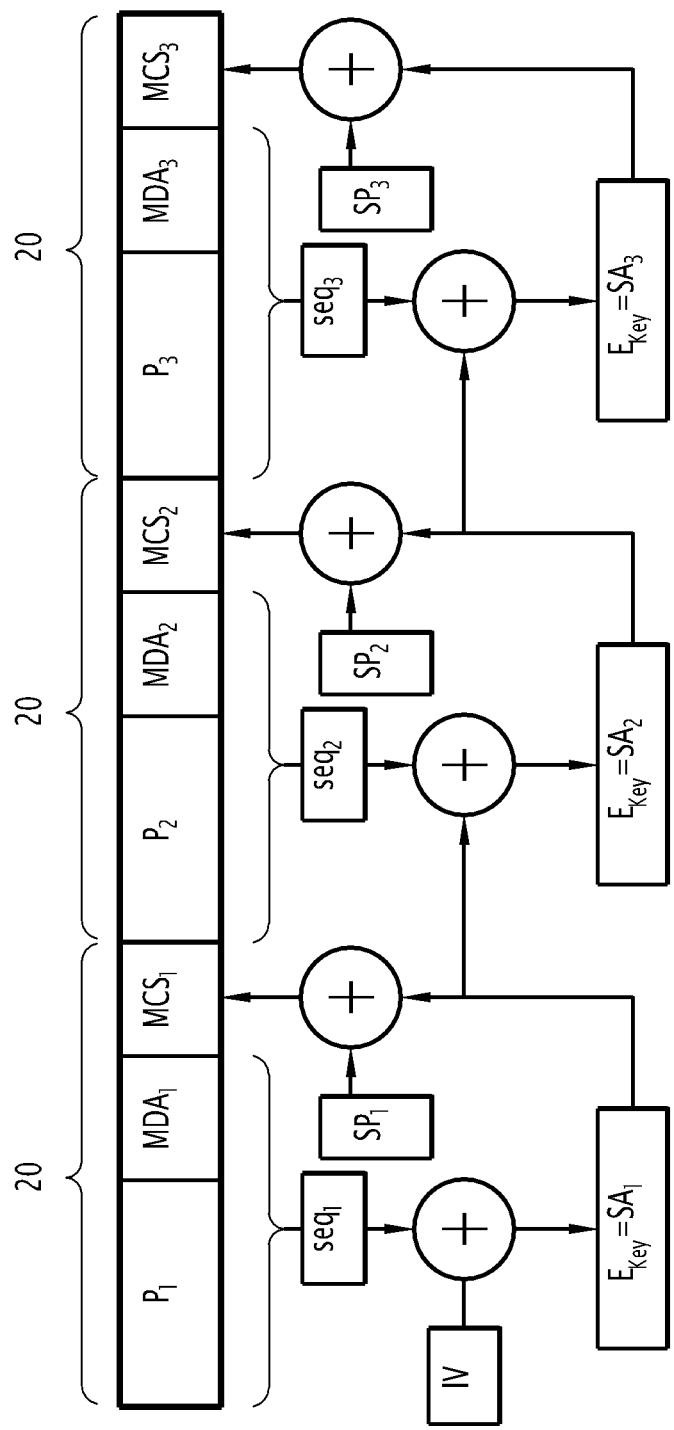
FIG. 5 is a flow chart illustrating a fifth embodiment.

This embodiment is further explained by the flow chart of FIG. 5.

In FIG. 5, an application message M is divided into three portions designated by the general reference numerals $P_1$, $P_2$ and $P_3$. Each portion of this message is suited to be transmitted by a transmission unit.

Thus, as shown in FIG. 5, the verification sequence $MCS_1$ corresponding to the first portion $P_1$ is obtained based on the above formulae using a first auxiliary sequence $SA_1$. This first auxiliary sequence $SA_1$ is further obtained using the corresponding sequence Seq and the initial value IV.

The verification sequence $MCS_2$ corresponding to the second portion $P_2$ is obtained based on the above formulae using a second auxiliary sequence $SA_2$. This second auxiliary sequence $SA_2$ is further obtained using the corresponding sequence Seq and first auxiliary sequence $SA_1$.

The verification sequence $MCS_3$ corresponding to the third portion $P_3$ is obtained analogously.

In the five embodiments described above, the sequences MDA and MCS are distinct, as shown in FIG. 4. Thus, in these embodiments, the additional message MA is referred to as 'without distribution'.

According to a sixth embodiment, the verification sequence MCS is divided according to a distribution rule in the identification sequence MDA.

Thus, in this embodiment, the additional message MA is referred to as 'with distribution'.

Figure 6:
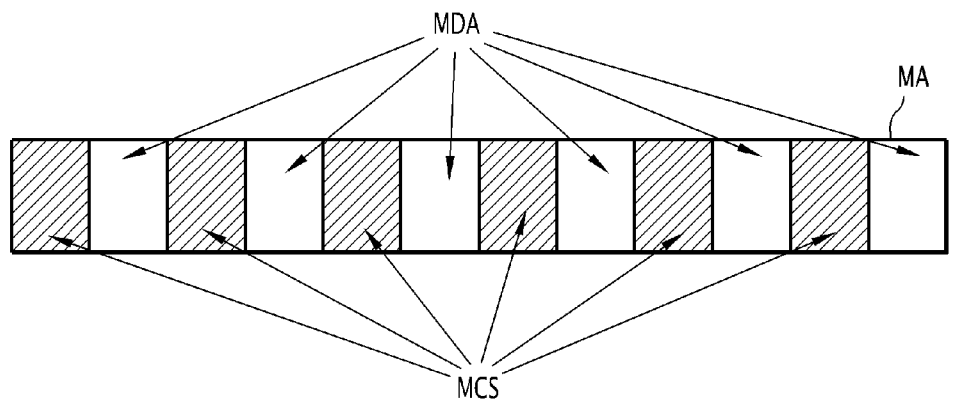
FIG. 6 is a schematic view of an additional message with distribution that is part of the transmission unit of FIG. 2.

FIG. 6 is a schematic representation of an example of a structure of an additional message MA without distribution associated with an application message M.

This distribution rule is known to the modules of production and consumption.

It defines, e.g., the same fixed positions in portions of the sequence MCS in the sequence MDA for all application messages M.

In one variant, this rule defines, e.g., variable positions of the portions of the sequence MCS in the sequence MDA for different application messages M based, e.g., on the occurrence of one application message M on another.

In the latter case, the distribution rule is variable over time.

For a message M representing a verification datum DC and a message M representing a monitoring datum DS corresponding to this verification datum DC, the distribution rules used are different or complementary.

The generation modules 42 and 43 allow an additional message MA to be formed including the verification sequence MCS distributed in the identification sequence MDA according to this rule.

Likewise, the reading modules 44 and 45 are suited to extract the verification sequence MCS from the identification sequence MDA according to this rule.

In this embodiment, the verification sequence MCS is equal, e.g., to the main sequence, i.e.:

$$MCS = SP.$$

In other words, this verification sequence MCS is created without any encoding.

In one variant, the verification sequence MCS is created according to one of the five techniques corresponding to the first five embodiments.

Of course, numerous other combinations of the embodiments are also possible.

The operation of the architecture 10 according to certain embodiments will be described below.

An instruction produced by the module of production 12 intended for the module of consumption 14 is first transformed into a critical avionics datum.

This critical avionics datum is then processed by the modules of generating transmission units 42 and 43.

Thus, the generation module 42 generate a verification datum DC, and the generation module 43 generate a monitoring datum DS corresponding to this verification datum DC to form the corresponding critical avionics datum.

Each verification DC or surveillance datum DS is then represented by an application message M.

In the module 42 or 43, the application message M is divided into a plurality of portions P. This division is carried out, e.g., based on the length of the message M.

This division allows, in particular, for the optimization of the operation of various components of the network 16 based on the processing speed of the data.

In certain cases, the message M is not divided.

Then, the generation module 42 or 43 associates an additional message MA with this application message M or a portion P corresponding to this message M.

The additional message MA contains identifying and verification information associated with this application message M.

The rules for the production of an additional message corresponding to a verification datum DC and a corresponding monitoring datum DS are different and/or complementary.

Thus, the module 42 or 43 first constructs an identification sequence MDA. This sequence may be associated with the entire application message M or its portion P.

The module 42 or 43 then constructs a verification sequence MCS using one of the construction techniques described above.

For the sixth embodiment, the module of generation of transmission units 42 or 43 additionally distributes the verification sequence MCS within the identification sequence MDA according to a distribution rule.

Thus, the application message M or the portion P and the associated additional message MA form one transmission unit that is then transmitted over the network 16.

After the transmission unit is received by the module of consumption 14, the integrity of the application message M or its portion P corresponding to a verification datum DC is verified by the reading module 44.

The integrity of the application message M or its portion P corresponding to a monitoring datum DS is verified by the reading module 45.

Thus, the reading module 44 or 45 first extracts the application message M or its portion P from the transmission unit received.

For the sixth embodiment, the module of reading 44 or 45 additionally extract the verification sequence MCS from the identification sequence MDA according to the distribution rule.

The reading module 44 or 45 then constructs a verification sequence MCS' using the message M received or its portion P received and the sequence MDA received.

This construction is based on the same production method used by the module of generating transmission units 42 or 43.

Then, the reading module 44 or 45 compares the verification sequence MCS received with the reconstructed verification sequence MCS'.

If the two sequences are identical, the message M or its portion P was transmitted without errors.

If the two sequences are not identical, the message M or its portion P was transmitted with errors.

After receiving all portions P corresponding to the same application message M, the reading module 44 or 45 reconstructs this message M and transmit it then in the consumption module 14.

For a message M representing a verification datum DC, the reading module 44 transmits this datum to the verification unit 46.

For a message M representing a monitoring datum DS, the reading module 45 transmits this datum to the verification unit 46.

Lastly, the verification module 46 verifies the integrity of the verification datum DC using the corresponding monitoring datum DS.

The architecture 10 thus allows highly reliable transmission of these different types of data (verification, monitoring) using the same physical pathway, which represents a special advantage of certain embodiments.

Of course, other embodiments are also possible.

Furthermore, this architecture may be applied to data other than the verification and monitoring data described above, and may apply generally to any type of data that cannot be interfered with.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A critical data transmission system for avionics systems, the system comprising:
    at least one first processor configured to execute a software module of production of data comprising a plurality of software modules of generation;
    a second processor configured to execute a software module of consumption of data; and
    at least one physical pathway implemented by intermediate communication equipment and linking the software module of production executed by the first processor to the software module of consumption executed by the second processor,
    wherein the software module of production is configured to transmit each critical datum by at least two data, one of a first independent type and one of a second independent type that cannot interfere with one another and further enable the verification of the integrity of the critical datum, each critical datum comprising a control instruction for the avionics system,
    wherein the software module of production is further configured to transmit the datum of the first independent type or second independent type in the form of one data transmission unit including:
        at least one portion of an application message; and
        one additional message containing identifying and verification information associated with the application message,
    wherein:
        the additional message of each transmission unit further includes i) a verification sequence configured to verify the integrity of the application message and ii) an identification sequence including a static part enabling the identification of the application message corresponding to the transmission unit and a variable part enabling the distinguishing of the application message; and
        the software module of production is further configured to i) transmit each datum of the first independent type and the second independent type corresponding to the critical datum by the same physical pathway implemented by the same intermediate communication equipment, ii) generate each datum of the first independent type and the second independent type corresponding to the critical datum by a plurality of different and distinct software modules of generation and iii) generate the verification sequence by encoding at least a portion of the identification sequence with a cryptographic key, the difference between the software generation modules lies in at least one of the following:
different physical locations,
different source partition identifications,
different message identifications,
different logical communication channel identifications,
different software production module identifications,
different recipient or recipient group identifications,
different network or protocol types, and
different physical device types.

2. The system of claim 1, wherein the difference between the software generation modules further lies in different or complementary, predetermined production rules of at least one part of the corresponding data.

3. The system of claim 2, wherein a selection rule of the production rule depends on the sources or criteria of the differences and the parameterization criteria of the selection rule, wherein the parameterization criteria of the selection rule includes:
a level of criticality of the emitting equipment and/or the source partition;
a level of security of the emitting equipment and/or the source partition; or
quality criteria related to one message relative to another.

4. The system of claim 1, wherein:
the software module of production is further configured to generate the verification sequence corresponding to the transmission unit based on a main sequence representing a cyclical redundancy control code of the concatenation of at least one portion of the application message corresponding to the transmission unit with the identification sequence.

5. The system of claim 4, wherein that the verification sequence and the identification sequence corresponding to a single transmission unit are distinct.

6. The system of claim 5, wherein the cryptographic key comprises at least one of a first cryptographic key and a second cryptographic key and wherein the verification sequence is one element chosen in the following group which includes:
the result of the application of the operator XOR between:
a sequence resulting from the encoding of at least one part of the identification sequence with the first cryptographic key represented by a field of the variable part of the identification sequence; and
the main sequence;
the result of the application of the operator XOR between:
a sequence resulting from the encoding of at least one part of the identification sequence with the second cryptographic key represented by a sequence that is variable over time and known to the production and software consumption modules at all times; and
the main sequence;
the result of the application of the operator XOR between:
a sequence resulting from the encoding of at least one part of the identification sequence with the first cryptographic key represented by the encoding of a field of the variable part of the identification sequence with the second cryptographic key represented by a sequence known to the software modules of production and consumption; and
the main sequence;
the result of the application of the operator XOR between:
a sequence resulting from the encoding of at least one part of the identification sequence with the first cryptographic key represented by the result of the application of the operator XOR between:
a field of the variable part of the identification sequence; and
a sequence known to the software modules of production and consumption; and
the main sequence;
the result of the application of the operator XOR between:
a sequence resulting from the encoding of at least one part of the identification sequence and at least one part of the application message with the first cryptographic key represented by a field of the variable part of the identification sequence; and
the main sequence;
the result of the application of the operator XOR between:
a sequence resulting from the encoding of at least one part of the identification sequence and at least one portion of the application message with the second cryptographic key represented by a sequence that is variable over time and known to the software production and consumption modules at all times; and
the main sequence;
the result of the application of the operator XOR between:
a sequence resulting from the encoding of at least one part of the identification sequence and at least one portion of the application message with the first cryptographic key represented by the encoding of a field of the variable part of the identification sequence with the second cryptographic key represented by a sequence known to the software modules of production and consumption; and
the main sequence; and
the result of the application of the operator XOR between:
a sequence resulting from the encoding of at least one part of the identification sequence and at least one portion of the application message with the first cryptographic key represented by the result of the application of the operator XOR between:
a field of the variable part of the identification sequence; and
a sequence known to the software modules of production and consumption; and
the main sequence.

7. The system of claim 6, wherein the cryptographic key is only known to the software modules of production and consumption in order to ensure the confidentiality of the messages.

8. The system of claim 6, wherein, for an application message including a plurality of sequenced portions, the verification sequence of the transmission unit associated with the first portion is the result of the application of the operator XOR between:
a sequence resulting from the encoding of a sequence represented by the result of the application of the operator XOR between:
at least one part of the identification sequence corresponding to this portion; and
a predetermined initial value; and the main sequence corresponding to this portion; and wherein the verification sequence of the transmission unit associated with the each following portion is the result of the application of the operator XOR between:

an auxiliary sequence resulting from the encoding of a sequence represented by the result of the application of the operator XOR between:

at least one part of the identification sequence corresponding to this portion; and an auxiliary sequence corresponding to the preceding portion; and the main sequence corresponding to this portion.

9. The system of claim 6, wherein, for an application message including a plurality of sequenced portions, the verification sequence of the transmission unit associated with the first portion is the result of the application of the operator XOR between:

a sequence resulting from the encoding of a sequence represented by the result of the application of the operator XOR between:

at least one part of the identification sequence and at least one portion of the application message; and a predetermined initial value; and the main sequence corresponding to this portion; and wherein the verification sequence of the transmission unit associated with the each following portion is the result of the application of the operator XOR between:

an auxiliary sequence resulting from the encoding of a sequence represented by the result of the application of the operator XOR between:

at least one part of the identification sequence and at least one portion of the application message; and an auxiliary sequence corresponding to the preceding portion; and the main sequence corresponding to this portion.

10. The system of claim 6, wherein the verification sequence is distributed within the identification sequence according to a distribution rule known to the software modules of production and consumption.

11. The system of claim 10, wherein the distribution rule is constant over time.

12. The system of claim 10, wherein the distribution rule is variable over time.

13. The system of claim 10, wherein the distribution rule is only known to the software modules of production and consumption in order to ensure the confidentiality of the messages.

14. The system of claim 4, wherein the identification sequence includes one or more of the following information:

identifying information of the software module of production of the corresponding application message;

identifying information of the corresponding application message;

information on the logical order of the corresponding application message;

information on the logical sequence number of the corresponding application message; and information on the date of generation of the corresponding application message.

15. The system of claim 1, wherein the additional message is associated with the application message in whole or in part by portion.

\* \* \* \* \*